United States Patent [19]

Garscadden et al.

[11] 4,407,705
[45] Oct. 4, 1983

[54] PRODUCTION OF NEGATIVE IONS OF HYDROGEN

[75] Inventors: Alan Garscadden, Yellow Springs; William F. Bailey; Gary L. Duke, both of Dayton, all of Ohio

[73] Assignee: The United States of America as represented by the Secretary of the Air Force, Washington, D.C.

[21] Appl. No.: 263,629

[22] Filed: May 14, 1981

[51] Int. Cl.³ .................. B01J 19/08; B01J 19/12; B01J 19/26
[52] U.S. Cl. ............................................. 204/157.1 H
[58] Field of Search .................. 204/157.1 H, 164; 423/648 R

[56] References Cited

U.S. PATENT DOCUMENTS 4,092,405  5/1978  von Rosenberg et al. ... 204/157.1 A
4,110,182  8/1978  Stevens .................... 204/157.1 A
4,176,025  11/1979  Chen et al. ............... 204/157.1 A
4,220,510  9/1980  Brueck et al. ............. 204/157.1 A Primary Examiner—Howard S. Williams
Attorney, Agent, or Firm—Donald J. Singer; Bobby D. Scearce

[57] ABSTRACT

A process for generating negative ions of hydrogen isotopes is described which comprises cooling the hydrogen gas below 300° K., and preferably to about 200° K., vibrationally exciting the molecules of the gas, and the dissociating the molecules by electron impact into neutral hydrogen atoms and negative hydrogen ions. Alternatively, the gas may first be vibrationally excited by heating or the like, and then cooled translationally, for example, by rapid expansion prior to dissociation by electron impact. The processes of this invention are characterized by control of non-equilibrium conditions to obtain large increases in dissociative attachment rates by increasing the population of hydrogen gas molecules having a higher vibrational energy state.

14 Claims, 7 Drawing Figures

PRODUCTION OF NEGATIVE IONS OF HYDROGEN

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of processes for generating ionic particle beams, and more particularly to the field of processes for production of negative ions. Specifically, this invention comprises a process for high efficiency production of negative ions of hydrogen isotopes (protium, deuterium and tritium).

Considerable interest exists for the production of intense beams of negative ions useful for such applications as low energy kinetic studies, material properties studies, high energy accelerator applications, production of fast neutral beams for controlled thermonuclear fusion studies, energy beam weapons devices, and other processes requiring directed energy beams.

Existing processes for producing negative ions fall into four broad categories, including double charge exchange for converting a positive ion beam into a negative ion beam, surface generated negative ions from charged particle bombardment, laser focus generation, and electrical discharge generation.

Prior art devices and method for the production of negative ion beams are lacking in capability for generating beams of sufficient intensity suitable for applications such as ion sources, or generation of fast neutral beams.

Production of negatively charged hydrogen isotope ions according to the present invention comprises the process of cooling (reducing the translational energy of) molecular hydrogen gas to a temperature of about 200° Kelvin; vibrationally exciting the molecules of the cooled gas by an excitation means, such as electrical discharge, electron beam, or laser irradiation; and dissociating the translationally cold and vibrationally excited molecules by electron impact to form one neutral hydrogen atom and one negatively charged hydrogen ion ($H^-$) from an impacted molecule (e.g., $H_2$). Alternatively, the gas molecules may first be vibrationally excited by heating through thermal or electrical discharge means and then cooled to a reduced translational energy either by gas dynamic expansion or by heat exchange techniques prior to dissociation by electron impact. The processes of this invention may be applied to all isotopes of hydrogen (i.e., protium ($H_2$), deuterium ($D_2$) or tritium ($T_2$)), and to isotopically mixed species (i.e., HD, HT, and DT).

Generation of negative ions using the processes of the present invention therefore comprises control of non-equilibrium conditions in the vibrational, translational and rotational energy states of the hydrogen molecule to achieve high rates of production of negative ions of hydrogen isotopes.

It is, therefore, an object of this invention to provide a process for efficient generation of negative ions of hydrogen isotopes.

It is a further object of this invention to provide a process for high rate generation of negative hydrogen ions.

These and other objects of the invention will become apparent as the description thereof proceeds.

SUMMARY OF THE INVENTION

In accordance with the foregoing principles and objects of the present invention, a process for generating negative ions of hydrogen isotopes is described which comprises cooling the hydrogen gas below 300° K., and preferably to about 200° K., vibrationally exciting the molecules of the gas, and then dissociating the molecules by electron impact into neutral hydrogen atoms and negative hydrogen ions. Alternatively, the gas may first be vibrationally excited by heating or the like, and then cooled translationally, for example, by rapid expansion prior to dissociation by electron impact. The processes of this invention are characterized by control of non-equilibrium conditions to obtain large increases in dissociative attachment rates by increasing population of hydrogen gas molecules having a higher vibrational energy state.

DESCRIPTION OF THE DRAWINGS

The processes of this invention will be more clearly understood from the following detailed description of specific embodiments thereof read in conjunction with the accompanying drawings wherein.

DETAILED DESCRIPTION

Figure 1:
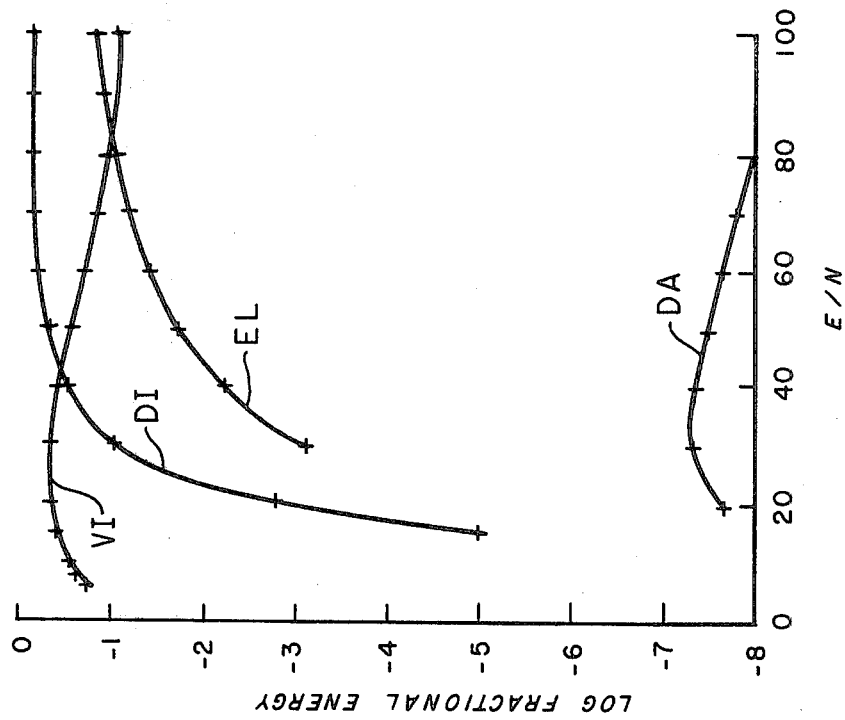
FIG. 1 shows the calculated fractional energy deposition as a function of E/N (volt.$cm^2$) for hydrogen (protium) for various excitation channels of the molecule.
Figure 2:
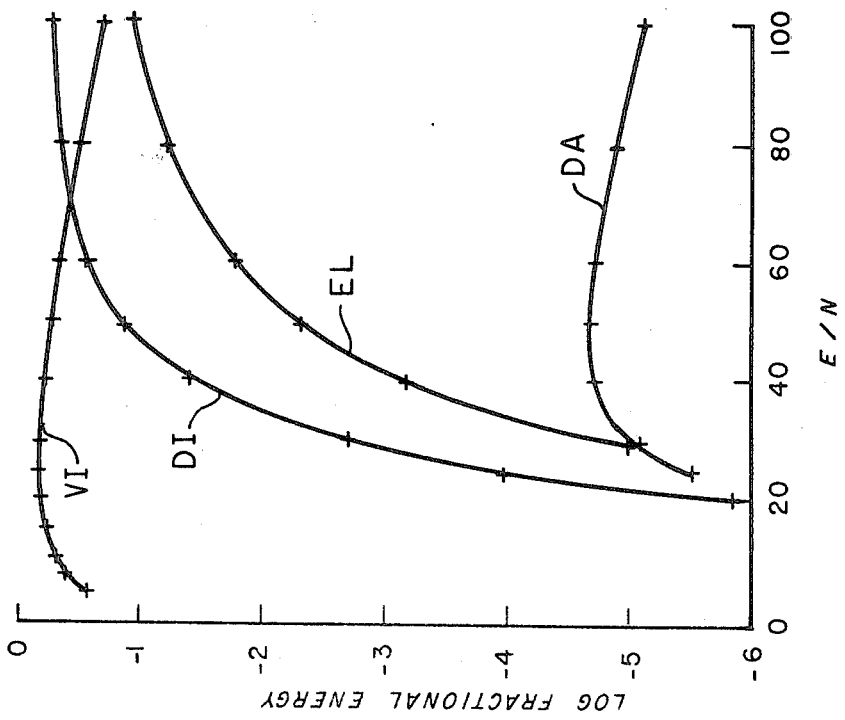
FIG. 2 shows fractional energy deposition versus E/N for deuterium.

One method for producing vibrationally excited hydrogen molecules is to impact the molecules with energetic electrons. The energies of these electrons are preferably chosen to be distributed within a range of values where the probabilities for vibrational excitation are near their maximum. The impacting electrons lose discrete amounts of energy corresponding to discrete amounts of energy absorbed by the molecules in becoming vibrationally excited. The magnitude of such energy transfer is of the order of 0.5 eV (electron volt). A convenient method for impacting hydrogen molecules with electrons is in an electric discharge, however, in such a discharge other reactions take place so that not all the energy of the electrons in the discharge contribute to vibrational excitation. FIGS. 1 and 2, respectively for hydrogen (protium) and deuterium, show the calculated fractional energy deposition into the hydrogen molecule as a function of the parameter E/N (volt·$cm^2$), which is the ratio of the electric field E (volt/cm) to molecular number density N ($cm^{-3}$) in the discharge. This ratio determines the main discharge parameters, i.e., for given pressure and temperature there will be N molecules per cm³ in the discharge; the voltage at which the discharge operates can then be determined from the ratio E/N and the distance (d) between the electrodes by the equation V=E/N×N×d. In each of FIGS. 1 and 2, the curves labeled VI illustrate the fractional electron energy contributing to vibrational excitation of the molecule such as by the reaction, $$e^- + H_2(v=0) \rightarrow e^- + H_2(v=1,2,3,4,\ldots)$$

where v is the vibrational quantum number and represents the final vibrational state of the molecule; the curves labeled DI illustrate the fractional energy contributing to neutral dissociation of the molecules as by, $$e^- + H_2 \rightarrow H + H + e^-;$$

the curves labeled EL illustrate the fractional energy contributing to electronic excitation of the molecule as by, $$e^- + H_2 \rightarrow e^- + H_2^*;$$

and the curves labeled DA illustrate the fractional energy contributing to dissociative attachment of the molecules, from all vibrational states where the reaction for a given vibrational state is, $$e^- + H_2(v) \rightarrow H_2^- \rightarrow H + H^- \text{ (summed over all vibrational states)}.$$

Figure 3:
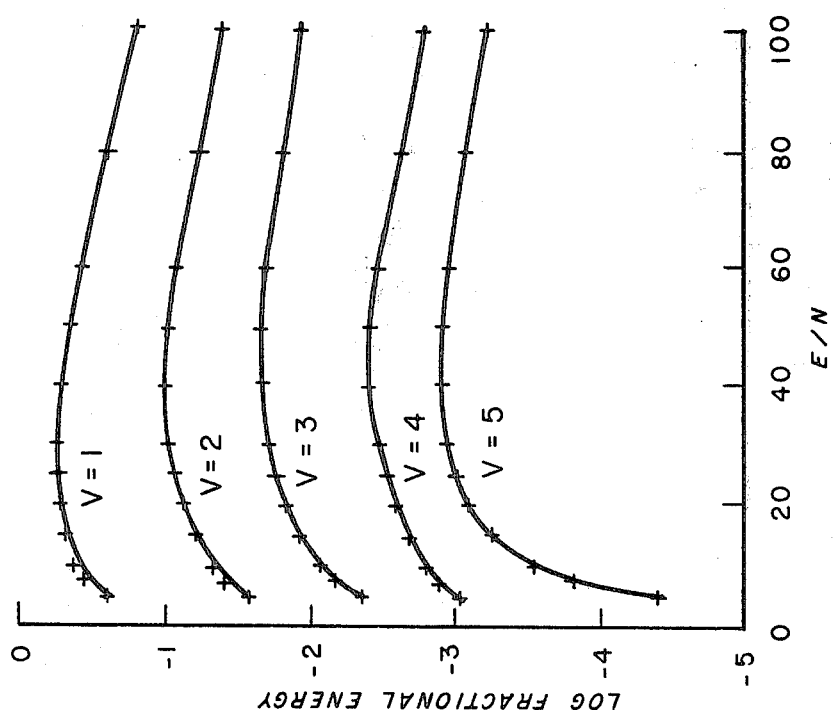
FIG. 3 shows the calculated fractional energy deposition into various vibrational energy states of the hydrogen molecule as a function of E/N.

FIGS. 1 and 2 demonstrate that most of the energy of the discharge contributes to vibrational excitation of the impacted molecule when the discharge operates between $10 \leq E/N \leq 40$ Td, where Td (Townsend) $=10^{-17}$ volt·cm². FIG. 3 shows the calculated distribution of the fractional energy resulting in the vibrational excitation to the various higher (v=1,2,3,4,5,...) vibrational energy states for hydrogen.

A self sustained discharge will operate only at a value of E/N at which the production of electrons from such processes as ionization equal the loss of electrons from such processes as diffusion, dissociative attachment, and electron-ion recombination. Loss of vibrationally excited molecules in the discharge may principally occur through a vibrational-to-translational energy exchange, wherein a vibrationally excited hydrogen molecule through collision with an atom or other particle in the discharge may lose some or all of its vibrational energy by increasing the kinetic energy of the colliding particle. The probability of heavy particle vibrational-to-translational energy exchange increases with gas temperature, and is proportional to $\exp(-c/T_g^{\frac{1}{3}})$, where c is a constant characteristic of the gas, and $T_g$ is the gas translational temperature. The same process can occur when the electron is the colliding particle. In this case, it is generally referred to as a superelastic collision. The energy dependence of this collision differs from that of heavy particle vibrational-translational energy transfer.

The distribution of vibrationally excited molecules in equilibrium in a gas of temperature $T_g$ is given by a Boltzmann distribution:

$$\frac{N_u}{N_l} = \exp - \frac{(E_u - E_l)}{kT_g}$$

where $E_u$ is the energy of vibrationally excited molecules, $E_l$ is the lower vibrational energy, and k is the Boltzmann constant (Ref: G. Herzberg, *Spectra of Diatomic Molecules*, 1950, pp 121–124). When electron impact excitation of the hydrogen molecules occurs efficiently, the vibrational manifold distribution of excited molecules may acquire a vibrational temperature which can be much greater than the gas translational temperature. Under these circumstances, the distribution of vibrationally excited states becomes $$\frac{N_u}{N_l} = \exp - \left(\frac{E_u - E_l}{kT_v}\right)$$

where, in general, $T_g < T_v < T_e$, and $T_e$ is the electron temperature. By vibrationally exciting the molecules by means other than heating, such as in an electric discharge, production of the vibrationally excited molecules may be significantly increased, and losses may be reduced by cooling the gas (i.e., reducing $T_g$).

The cooling of the gas enhances a second process by which the molecules may be selectively excited or pumped to higher vibrational energy states through anharmonic pumping. The energy spacing between successively higher (i.e., v=1,2,3,...) vibrational energy states within the gas molecule decreases with each successively higher state. Thus, when two vibrationally excited molecules having adjacent vibrational energy states collide, the lower energy molecule may de-excite to the next lower energy state thereby releasing sufficient energy to raise the higher energy molecule to the next higher state; at low translational energies the reverse energy exchange will not occur since the higher energy molecule does not release sufficient energy in dropping to its next lower energy state to excite the lower energy molecule to its next higher vibrational state. This selective anharmonic pumping of vibrationally excited molecules to higher vibrational levels has been demonstrated in experimental investigations of the carbon monoxide laser.

Figure 4:
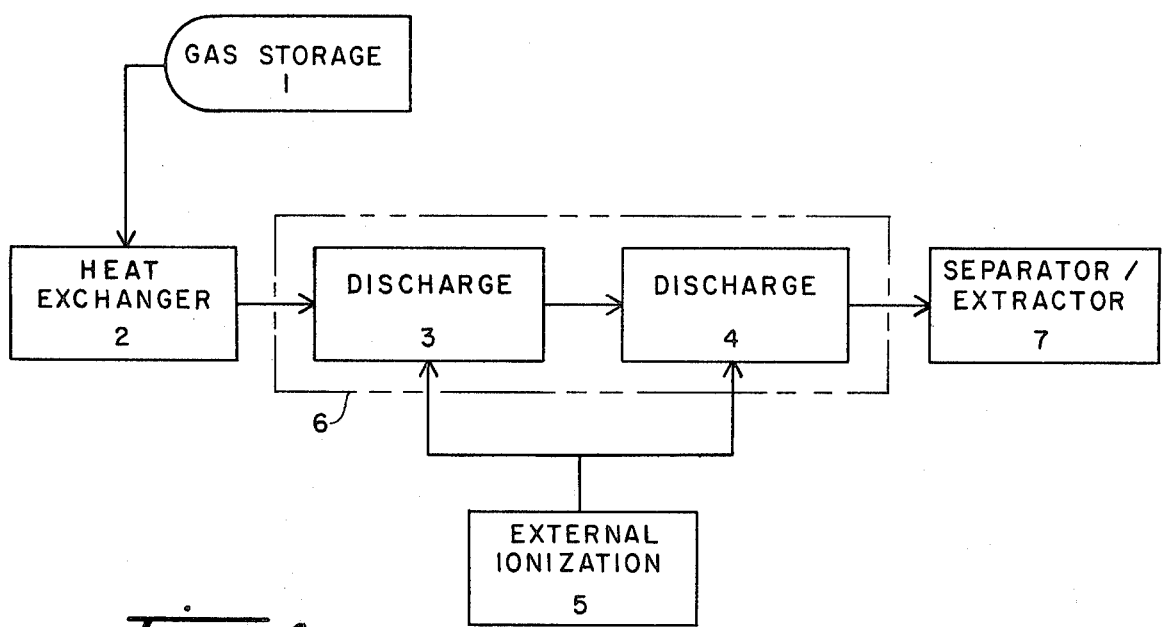
FIG. 4 is a schematic representation of one embodiment of a process for generating negative hydrogen ions according to this invention.
Figure 5:
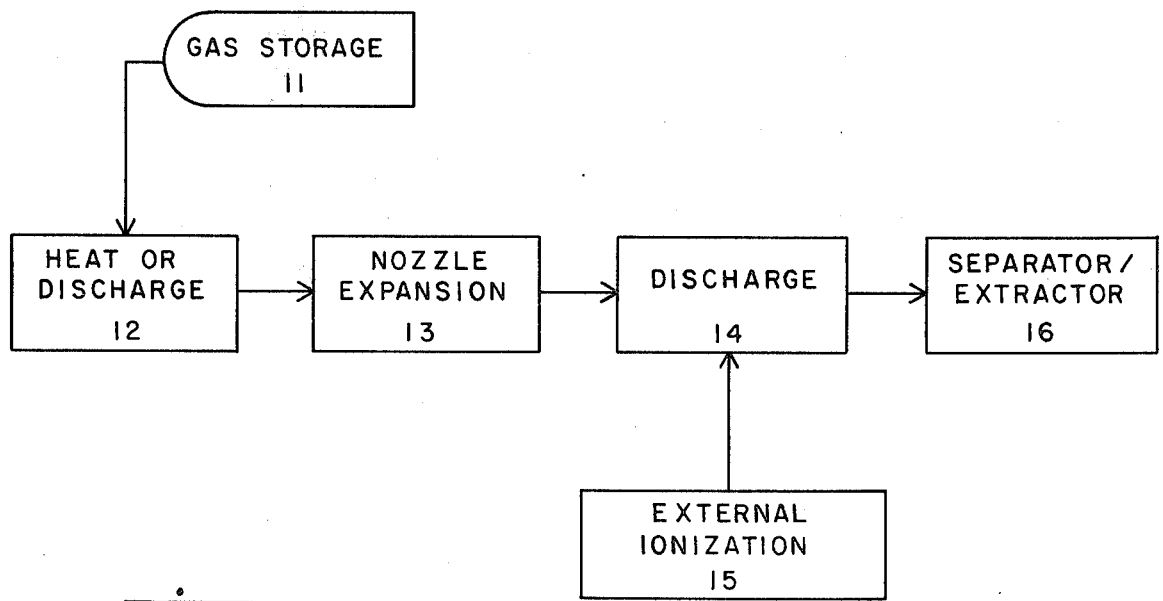
FIG. 5 is a schematic representation of an alternate embodiment of a process of this invention.

The molecules may be excited to higher (i.e., v=2,3,4,...) vibrational energy states and/or dissociated into hydrogen atoms and negative hydrogen ions by either of two arrangements of this invention. As shown in FIG. 4, the molecules may be cooled to about 200° K. to reduce vibrational-to-translational energy losses, then vibrationally excited (pumped) primarily to the v=1 and v=2 levels by an electric discharge (FIG. 3) then anharmonically pumped to higher energy levels. Alternatively, as shown in FIG. 5, the molecules may first be vibrationally excited, by electric discharge or by heating (to the v=1 and v=2 levels), then rapidly cooled in order to obtain a low translational temperature. This low temperature reduces vibrational-translational energy losses and enhances anharmonic pumping to higher vibrational energy levels. Such cooling can be accomplished by using an expansion nozzle. These procedures significantly increase the populations of molecules in higher (v=4,5,6,7,...) vibrational energy levels, and increases the rate of dissociative attachment. This increased rate achieved by deliberate use of non-equilibrium conditions is a feature of this invention.

Referring now to FIG. 4, one embodiment of a process of this invention is illustrated schematically in the flow diagram presented therein. According to the process of FIG. 4, gaseous hydrogen (protium, deuterium, tritium, or isotopically mixed species) is supplied from gas storage 1 through an appropriate gas handling system (not shown) to heat exchanger 2, where the gas is thermally cooled below 300° K., and preferably to about 200° K. The cooled gas is then subjected to an electrical discharge 3 wherein the cooled gas molecules are vibrationally excited by electron impact to the v=1 or v=2 states. As discussed supra, the ratio E/N for this discharge optimally is maintained at from about 10 to about 40 Td. The vibrationally excited gas is then subjected to further electron impact through electrical discharge 4 wherein the vibrationally excited molecules are anharmonically pumped to higher (v=3,4, ...) states and dissociated into neutral hydrogen atoms and negative hydrogen ions. Either or both of electrical discharges 3 and 4 may additionally employ external ionization source 5 of energetic electrons or an efficiently ionized additive such as xenon or nitric oxide. Such source employment permits operation at selected E/N for the particular discharge. Alternatively, the discharges 3 and 4 may be combined in a single discharge having the E/N thereof spatially modified and/or controlled by such as external ionization source 5. Discharges 3 and 4 may be subject to conventional cooling means 6 (for example, peripheral heat exchanger jacket shown schematically by dashed peripheral line 6) to maintain the (translational) gas temperature at the desired level (e.g., about 200° K.). The negatively charged hydrogen ions (H$^-$, or D$^-$, or T$^-$) so produced may then be extracted by the imposition of appropriate magnetic or electric fields of separator/extractor 7.

Alternatively, negative ions may be produced by the process of this invention as shown in FIG. 5. In this embodiment, hydrogen gas (H$_2$, D$_2$, T$_2$, HD, HT or DT) may first be mixed within gas storage 11 with any suitable inert gas diluent such as helium, neon, argon, or the like, suitable to achieve translational cooling of the hydrogen upon rapid expansion of the gas mixture. The dilution ratio is not a limiting factor or an exceptionally sensitive parameter as applied to the processes of this invention. However, the flexibility of diluent composition is advantageous in the design of an auxiliary ionization source. The hydrogen of this mixture is then vibrationally excited either by heating or by discharge 12, wherein the gas is heated to a vibrational temperature equivalent beyond 1500° K. The dilution is then rapidly expanded through such as nozzle expansion means 13 to reduce the translational temperature to approximately 200° K. The cooled gas mixture is then subjected to electrical discharge 14 having the desirable E/N (optimally about 30 Td) to achieve dissociative attachment of the vibrationally excited hydrogen molecules. Discharge 14 may be supplemented by external ionization source 15 to optimize the E/N for discharge 14. The negative (H$^-$, D$^-$, or T$^-$) ions so produced may then be separated by the appropriate magnetic or electric fields of separator/extractor 16 in a manner similar to the process of FIG. 4.

The dissociative attachment reaction of interest proceeds from the ground electronic state of H$_2$, viz., $^1\Sigma_g^+$ as follows:

$$e^- + H_2(v \geq o) \rightarrow H_2^-(^2\Sigma_u^+, ^2\Sigma_g^+) \rightarrow H + H^-$$

The electron impacting the H$_2$ molecule becomes attached thereto resulting in a temporary negative ion $$H_2^-(^2\Sigma_u^+, ^2\Sigma_g^+).$$

Figure 6:
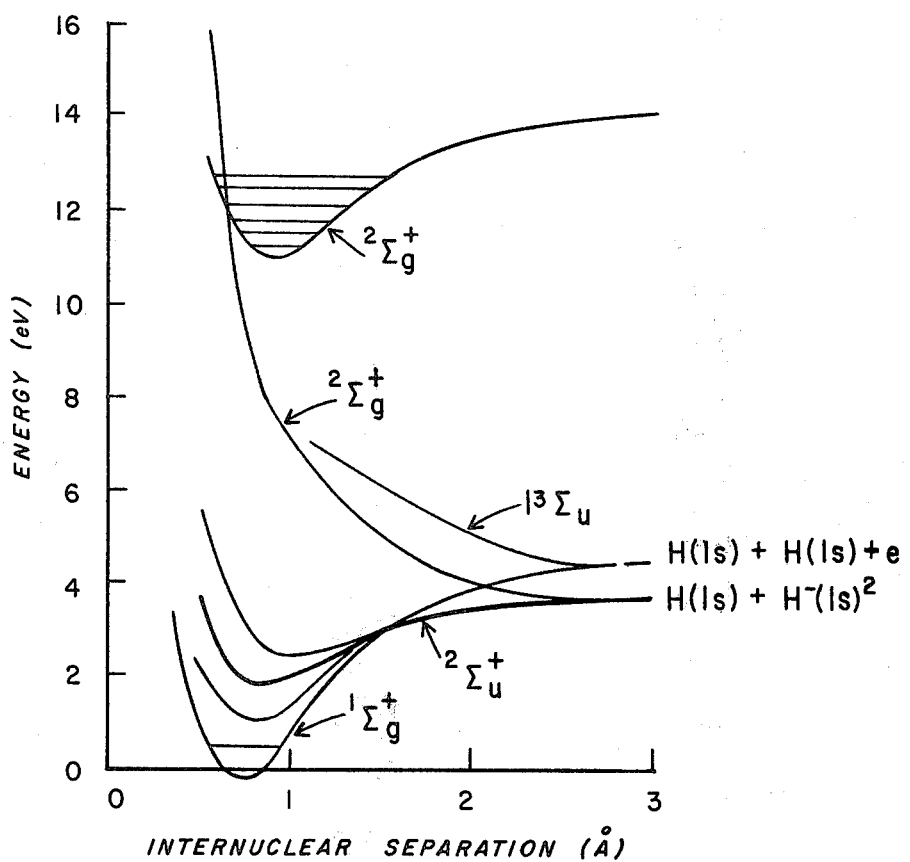
FIG. 6 is a potential energy diagram for the $H_2$ molecule depicting some negative ion states thereof, and the products of some of the dissociating states.

These energy states, along with the ground electronic state of the H$_2$ molecule are presented schematically in FIG. 6 showing the potential energy diagram for the H$_2$ molecule including a representation of the vibrational (v=1,2,3, ...) energy states. An examination of the potential energy diagrams of each state reveals that if the energy of the negative ion (H$_2^-$) is greater than about 3.5 eV, it will immediately dissociate into H+H$^-$. If the electron has only enough kinetic energy to create the molecules in the H$_2^-$ bound $^2\Sigma_u^+$ state (i.e., the region of the $^2\Sigma_u^+$ curve below 3.5 eV), then the H$_2$ molecule may decay back to the primary products H$_2$+e$^-$. The probability that the dissociative reaction will occur is a function of the initial vibrational level of the H$_2$ molecule and the initial kinetic energy of the electron. This functional dependence results in different cross-sections for the collision for different initial vibrational states. The cross-sections for the reaction, $$e^- + H_2(v=6) \rightarrow H + H^-$$

is more than three orders of magnitude larger than the cross-sections for the reaction, $$e^- + H_2(v=0) \rightarrow H + H^-.$$

Figure 7:
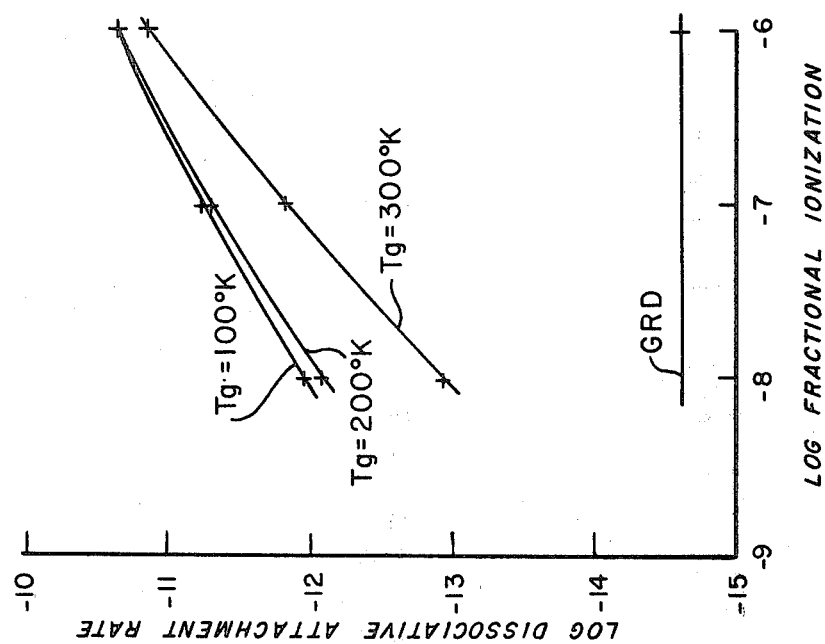
FIG. 7 is a graphical representation of the dissociative attachment rate as a function of fractional ionization within a discharge for various gas temperatures of the processes of this invention.

Therefore, populating the higher vibrational levels through the above described process makes the dissociative attachment reaction more probable. To promote an increase in the populations of the higher vibrational levels and therefore achieve an increase in the dissociative attachment reaction, two things are done. First, the hydrogen molecule is vibrationally excited; second, it is translationally cooled. This allows enhanced anharmonic pumping. The results of the combined effects on dissociative attachment are shown in FIG. 7. This enhanced dissociative attachment rate K$_{DA}$ for H$_2$ is displayed in FIG. 7 as a function of fractional ionization with the gas for E/N=40 Td, at gas temperatures of 100° K., 200° K. and 300° K. The line labeled GRD is the rate expected without using the process of this invention. The reduction of gas temperature from 300° K. to 200° K. results a substantial (up to 10 times) improvement in the effective dissociative attachment rate. However, FIG. 7 shows also that the additional advantage gained by cooling the gas below 200° K. is less significant than the change from 300° K. to 200° K.

It is clear from the foregoing, however, that the processes of this invention, including the control of non-equilibrium conditions of the gas by which it is characterized, provide significant increase in the generation rate of negative ions.

It is understood that the processes of this invention may be applicable to all isotopic species of molecular hydrogen gas, including H$_2$, D$_2$, T$_2$, HD, DT, and HT. Further, it is recognized that using the mixed isotopic species may enhance the effectiveness of the processes of this invention by reason of the vibrational energies and associated cross-section which characterize those mixed species. Therefore, generation of negative ions of hydrogen isotopes using hydrogen gas comprising mixed species is contemplated hereunder.

External ionization sources 5 and 15 may comprise such as an electron gun, a source of monochromatic light which may operate in conjunction with a photocathode for the discharge, or by photoionization of the medium (hydrogen gas) in the discharge. Other sources of externally induced ionization within the discharge may be used as may occur to one with skill in the field of this invention. In a closed cycle system wherein the hydrogen gas may be recirculated, the processes of this invention may be applied to hydrogen gas comprising tritium ($T_2$) or mixed molecules thereof (HT, DT). The tritium species, being radioactive, will itself contribute to supplemental ionization through its $\beta^-$ decay.

It is understood that the foregoing description of processes representative of the present invention is not inclusive of all embodiments contemplated hereunder, and that the configuration of component parts and operating parameters for the processes embodied herein may be varied within the scope of the appended claims, as might occur to one having skill in the field of this invention. Therefore, all such embodiments have not been shown in complete detail. Other embodiments may be developed without departing from the spirit and scope of the appended claims.

We claim:

1. A process for producing negatively charged ions of hydrogen which comrises:
   a. cooling hydrogen gas to below 300° K.;
   b. vibrationally exciting the molecules of the said hydrogen gas to a first vibrational energy state higher than the ground vibrational state;
   c. anharmonically pumping said gas to a second vibrationally excited state higher than said first state; and
   d. impacting the cooled and vibrationally excited hydrogen gas molecules with energetic electrons to produce, by dissociative attachment, neutral hydrogen atoms and negatively charged hydrogen ions.

2. A process for producing negatively charged ions of hydrogen which comprises:
   a. cooling hydrogen gas to below 300° K.;
   b. subjecting said gas to an electrical discharge to vibrationally excite the molecules of said gas to a first vibrationally excited energy state;
   c. anharmonically pumping said gas to a second vibrationally excited state higher than said first state; and
   d. impacting the cooled and vibrationally excited hydrogen gas molecules with energetic electrons to produce, by dissociative attachment, neutral hydrogen atoms and negatively charged hydrogen ions.

3. The process of claim 2 wherein the electrical discharge is operated at an E/N ratio of from about 10 to about 40 Townsend.

4. A process for producing negatively charged ions of hydrogen which comprises;
   a. cooling hydrogen gas to below 300° K.;
   b. subjecting said gas to an electrical discharge to vibrationally excite the molecules of said gas to a predetermined vibrationally excited energy state;
   c. anharmonically pumping by laser radiation said cooled and vibrationally excited gas molecules to a higher vibrationally excited energy state; and
   d. impacting the cooled and vibrationally excited hydrogen gas molecules with energetic electrons to produce, by dissociative attachment, neutral hydrogen atoms and negatively charged hydrogen ions.

5. The process of claims 1, 2 or 4 wherein the hydrogen gas is cooled to about 200° K.

6. The process of claim 1, 2 or 4, further comprising the step of separating the negatively charged hydrogen ions from the remainder of the hydrogen gas.

7. The process of claim 1, 2, or 4 wherein the hydrogen gas contains a hydrogen isotope selected from the group consisting of protium, deuterium, and tritium.

8. The process of claim 4 wherein the electrical discharge is operated at an E/N ratio of from about 10 to about 40 Townsend.

9. The process of claims 4 or 8 wherein the predetermined vibrationally excited energy state is selected from the group consisting of $v=1$ and $v=2$, and the higher vibrationally excited energy state is selected from the group consisting of $v=3$, $v=4$, $v=5$, $v=6$, and $v=7$.

10. A process for producing negatively charged ions of hydrogen which comprises:
    a. heating hydrogen gas to vibrationally excite the molecules of said gas;
    b. rapidly expanding said gas to reduce the translational energy of the molecules of said gas; and
    c. impacting said gas molecules with energetic electrons to produce, by dissociative attachment, neutral hydrogen atoms and negatively charged hydrogen ions.

11. The process of claim 10 wherein the hydrogen gas contains a hydrogen isotope selected from the group consisting of protium, deuterium, and tritium.

12. The process of claim 10 wherein the hydrogen gas is heated in an electrical discharge operated at an E/N ratio of from about 10 to about 40 Townsend.

13. The process of claims 10 or 12 wherein the hydrogen gas is contained in a gas mixture of hydrogen and a gaseous diluent selected from the group consisting of helium, neon, and argon.

14. The process of claim 10 or 12 further comprising the step of separating the negative hydrogen ions from the remainder of the gas.

* * * * *